United States Patent Office 2,797,410
Patented June 25, 1957

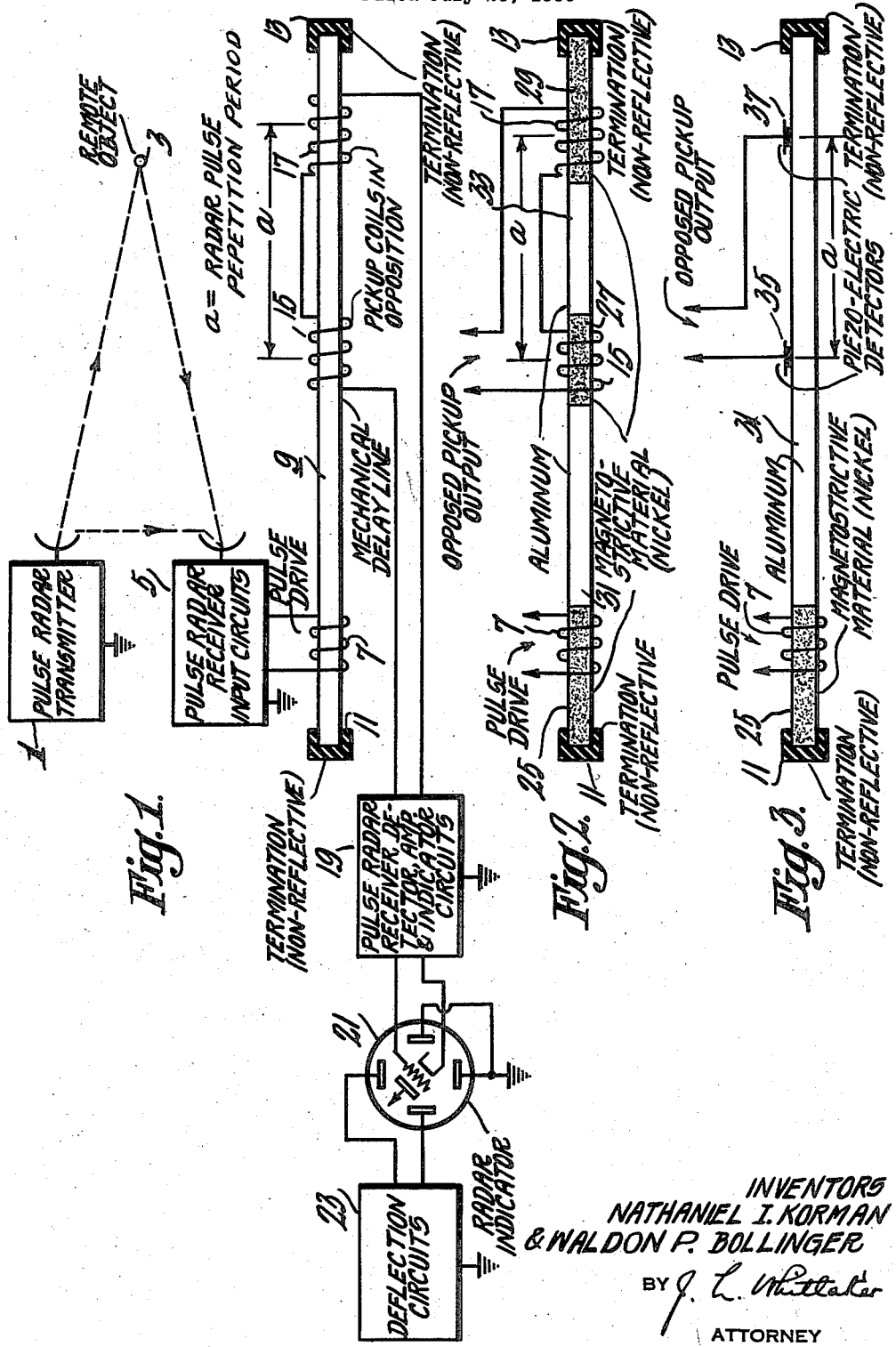
RADAR MOVING TARGET INDICATION METHOD AND SYSTEM
Filed July 28, 1950
INVENTORS
NATHANIEL I. KORMAN
& WALDON P. BOLLINGER

2,797,410

RADAR MOVING TARGET INDICATION METHOD AND SYSTEM

Nathaniel I. Korman, Merchantville, and Waldon P. Bollinger, Haddonfield, N. J., assignors to Radio Corporation of America, a corporation of Delaware Application July 28, 1950, Serial No. 176,268

5 Claims. (Cl. 343—7.7)

This invention relates broadly to improved methods and systems for distinguishing between stationary and moving target indications in pulse radar systems.

Conventional moving target indication (MTI) systems employed in pulse radar systems employ either mercury delay lines or storage tubes for distinguishing between the indications of stationary and moving radar targets. The purpose of such moving target indication systems is to eliminate the indications caused by stationary radar targets which would tend to obscure the indications of less prominent moving targets.

Heretofore, in line-by-line moving target indication systems, a relatively expensive and unwieldly mercury delay line has been employed for the cancellation of the stationary target indications. The delay line functions to store all of the echo pulses received from each radiated transmitted radar pulse so that they may be compared with the echos received from a subsequent radar transmitter pulse. The accuracy with which the stored and subsequent pulses may be compared determines the degree to which echos from fixed targets may be cancelled. Distortion of the echo wave trains on the delay line due to the limited frequency characteristics of the driving and pickup coils limits the degree of cancellation of the pulses corresponding to the fixed echos.

In conventional area moving target indication systems and in some of the more recent line-by-line and area MTI systems, storage tubes have been employed for comparing and cancelling the indications of pulses received from fixed echos. Such storage tubes are complex and expensive and require complex associated circuitry.

The instant invention is an improvement upon the mechanical delay line type of line-by-line moving target indicator systems. Instead of the cumbersome and expensive mercury delay line, the instant invention contemplates a line-by-line moving target indicator system employing a magnetostrictive mechanical delay line which is rugged and simple in construction. Such magnetostrictive delay lines may be constructed in the form of a hollow or solid rod of suitable length to provide the desired time delay characteristics. Magnetostrictive materials such as nickel may be energized by a driving coil actuated by the applied pulse energy to project successive pulses of mechanical energy along the delay line. If desired, to decrease the pulse attenuation along the delay line, the line may be constructed of separate joined portions of magnetostrictive and other materials such as aluminum. The magnetostrictive portion of the line thence is coupled to the driving coil and transfers the mechanical vibrations to the more efficient remaining portion of the line. Preferably, both ends of the delay line are terminated in non-reflective or resilient damping terminations to minimize undesired reflections from the ends of the line. One or more pickup units, such as coils coupled to magnetostrictive portions of the delay line or piezo-electric elements coupled to the line, are disposed along the line at suitable distances from the driving coil. When pickup coils are employed, it should be understood that the portion of the delay line coupled to the pickup coils should be of suitable magnetic materials such as nickel.

Another feature of the invention comprises the use of two pickup elements, such as the aforementioned coils or piezo-electric devices, relatively spaced along the delay line a distance equal to an integral multiple of a transmitted pulse period on the line and connected in opposition to an output circuit. The use of two pickup elements connected in opposition greatly reduces the distortion of the echo wave trains due to the limited frequency characteristics of the driving and pickup coils, thereby providing more effective cancellation of output signals responsive to fixed echo pulses.

Among the objects of the invention are to provide improved methods of and means for distinguishing between fixed and moving target radar echo pulses.

Anther object is to provide improved methods of and means for indicating pulse distortion on a delay line.

A further object is to provide an improved delay line system for moving target radar indications.

Another object is to provide improved methods of and means for employing a magnetostrictive mechanical delay line in a radar moving target indication system.

A still further object is to provide an improved mechanical delay line employing a plurality of pickup elements in a radar moving target indication system.

Another object is to provide improved methods of and means for reducing the cost and complexity of radar moving target indication systems.

The invention will be described in greater detail by reference to the accompanying drawing in which:

Figure 1 is a block schematic diagram of a conventional pulse radar moving target indication system employing a novel delay line system according to the invention;

Figure 2 is a fragmentary schematic view of a delay line employing two magnetic pickups according to the invention; and Figure 3 is a fragmentary schematic view of a delay line employing two piezo-electric pickups according to the invention. Similar reference characters are applied to similar elements throughout the drawing.

In Figure 1 of the drawing, a conventional pulse radar transmitter 1 radiates repetitive pulses of radio frequency energy which are reflected from remote stationary and moving targets, such as the object 3, to a conventional pulse radar receiver, the input circuits of which are represented by the block 5. Preferably, after suitable radio frequency amplification, the received pulses are applied to a driving coil 7 of a mechanical delay line arrangement in accordance with the invention. The mechanical delay line 9 comprises a cylindrical rod or tube having at least portions of magnetostrictive material such as nickel. The ends of the rod are terminated in non-reflective or resilient damping elements 11, 13 to prevent mechanical pulse reflections from the ends thereof. An effective termination is provided by clamping the ends of the line between 3 inch strips of andiol or the like. A pair of pickup coils 15, 17, connected in series opposition are coupled to the delay line rod at points separated a distance $a$ equal to the transmitted pulse repetition period, or an integral multiple thereof, on the delay line. As a typical example, for a repetition rate of 400 cycles, the line will have a total length of about 40 feet, the delay being about 5.3μ sec./inch. As a matter of convenience, the line may be folded to reduce size. The series opposed pickup coils are connected to the balance of the pulse radar receiver 19 comprising detector, amplifier, and indicator circuits whereby substantially only received pulses corresponding to echos from moving radar targets are indicated on a conventional radar indicator 21. Conventional indicator deflection circuits 23 also are connected to the indicator. In the example illustrated, the radar indicator is of the cathode ray type having electrostatic deflection elements and providing a conventional plane position indication (P. P. I.). The invention is equally applicable to other types of pulse radar systems and indicator arrangements.

Figure 2 represents a modification of the mechanical delay line of Figure 1 whereby the mechanical pulse attenuation on the delay line is minimized. The delay line 9 includes magnetostrictive portions 25, 27, 29, joined securely to non-magnetic portions 31, 33. The non-magnetic portions 31, 33 preferably are of aluminum or other material having low mechanical attenuation. The magnetostrictive portions 25, 27, 29 are disposed adjacent to the driving coils 7, and pickup coils 15, 17 respectively. The magnetostrictive and non-magnetic portions may be joined together by suitably plating the ends thereof and thence soldering the plated surfaces together.

Figure 3 illustrates another modification of the mechanical delay line wherein the driving coil 7 drives a magnetostrictive portion 25 in the manner illustrated in, and described by reference to Figure 2. The non-magnetic portion 31 of the line includes a pair of piezo-electric detectors 35, 37 connected in polarity opposition to the radar circuits 19. The piezo-electric detectors 35, 37 may be rigidly secured to the surface of the non-magnetic line portion 31 and spaced from each other by the same distance $a$. The piezo-electric detectors may comprise quartz or barium-strontium titanite elements which generate unidirectional output currents in response to vibratory energy applied thereto.

It should be understood that the systems of the invention and modifications thereof described heretofore will substantially cancel pulse energy on the mechanical delay line corresponding to echo pulses from stationary objects. Successive pulses so received will provide equal and opposite output currents in the circuit to the input of the radar receiver circuits 19. However, pulses on the delay line corresponding to reflected pulses from moving radar targets will not be received with the same time separation and hence will not cancel in the pickup coil output circuit. The use of two pickup coils or two pickup elements described heretofore overcomes problems encountered with previous systems employing a single pickup element. The frequency response characteristics of the single pickup element responsive to successive pulses on the delay line due to echoes from the same target causes improper cancellation of pulses corresponding to stationary targets.

What is claimed is:

1. A moving target indicating radar system including means for radiating successive radio frequency pulses for reflection from a plurality of remote stationary and moving objects, means for receiving said pulses after reflection from said objects, a magnetostrictive delay line, means for translating said pulses into mechanical pulsations of said delay line, a pair of spaced pickup elements coupled to said line and connected together in series opposition, means for combining the output signals derived from said serially connected elements in response to said mechanical pulsations to cancel successive received pulses reflected from said stationary objects, and means responsive to said combined signals for indicating the distances of said moving objects from said radiating means.

2. A radar moving target indicating system as claimed in claim 1 wherein said spaced pickup elements are separated a distance equal to an integral multiple, including one of the wavelength of said radiated radio frequency pulses.

3. A moving target indicating radar system including means for radiating successive radio frequency pulses for reflection from a plurality of remote stationary and moving objects, means for receiving said pulses after reflection from said objects, a magnetostrictive delay line, means for translating said pulses into mechanical pulsations of said delay line, a pair of spaced piezo electric pickup elements coupled to said line and connected in series opposition, means for combining the output signals derived from said serially connected elements in response to said mechanical pulsations to cancel successive received pulses reflected from said stationary objects, and means responsive to said combined signals for indicating the distances of said moving objects from said radiating means.

4. For use in a moving target indicating radar system comprising means for radiating successive radio frequency pulses for reflection from a plurality of remote stationary and moving objects and means for receiving said pulses after reflection from said objects, the improvement including means comprising a magnetostrictive delay line, means for translating said pulses into mechanical pulsations of said delay line, a pair of spaced pickup coils coupled to said line and connected in series opposition, means for combining the output signals derived from said serially connected coils in response to said mechanical pulsation to cancel successive received pulses reflected from said stationary objects, and means responsive to said combined signals for indicating the distances of said moving objects from said radiating means.

5. Apparatus according to claim 4 including means terminating said delay line to minimize pulse reflections from the ends of said line.

References Cited in the file of this patent

UNITED STATES PATENTS

| | | |
|---|---|---|
| 2,480,038 | Mason | Aug. 23, 1949 |
| 2,495,740 | Labin | Jan. 31, 1950 |
| 2,523,283 | Dickson | Sept. 26, 1950 |
| 2,526,229 | Hazeltine | Oct. 17, 1950 |
| 2,532,546 | Forbes | Dec. 5, 1950 |
| 2,540,560 | Wheeler | Feb. 6, 1951 |
| 2,540,827 | Mankin | Feb. 6, 1951 |

FOREIGN PATENTS

| | | |
|---|---|---|
| 581,166 | Great Britain | Oct. 3, 1946 |